UNITED STATES PATENT OFFICE.

ERICH SANDNER, OF CLEVELAND, OHIO, ASSIGNOR TO JULIUS I. WILE, OF CLEVELAND, OHIO.

WATER-REGULATOR FOR GAS-PRODUCERS.

967,980.   Specification of Letters Patent.   Patented Aug. 23, 1910.

Application filed December 26, 1908. Serial No. 469,237.

*To all whom it may concern:*

Be it known that I, ERICH SANDNER, a subject of the Emperor of Germany, residing at Cleveland, in the county of Cuyahoga and State of Ohio, have invented a certain new and useful Improvement in Water-Regulators for Gas-Producers, of which the following is a full, clear, and exact description, reference being had to the accompanying drawings.

My invention relates to water regulators for use in connection with gas producers and is more especially designed for use with gas producers of the type known as suction producers.

The object of my invention is to provide a water regulator which will automatically regulate the flow of water through the vaporizer proportionately with the amount of gas passing through the main which supplies the engine, furnace, or other device consuming the gas.

The invention further provides a regulator which may be set to regulate the amount of water supplied to the vaporizer when the amount of gas passing through the main is normal and remains unchanged. By means of this provision, I am enabled to vary the chemical composition of the gas and to increase or decrease the amount of hydrogen contained therein, without changing the quantity or quality thereof.

Generally speaking, the invention comprises the elements and combinations thereof set forth in the specification and claims.

Reference should be had to the accompanying drawings, in which—

Figure 1:
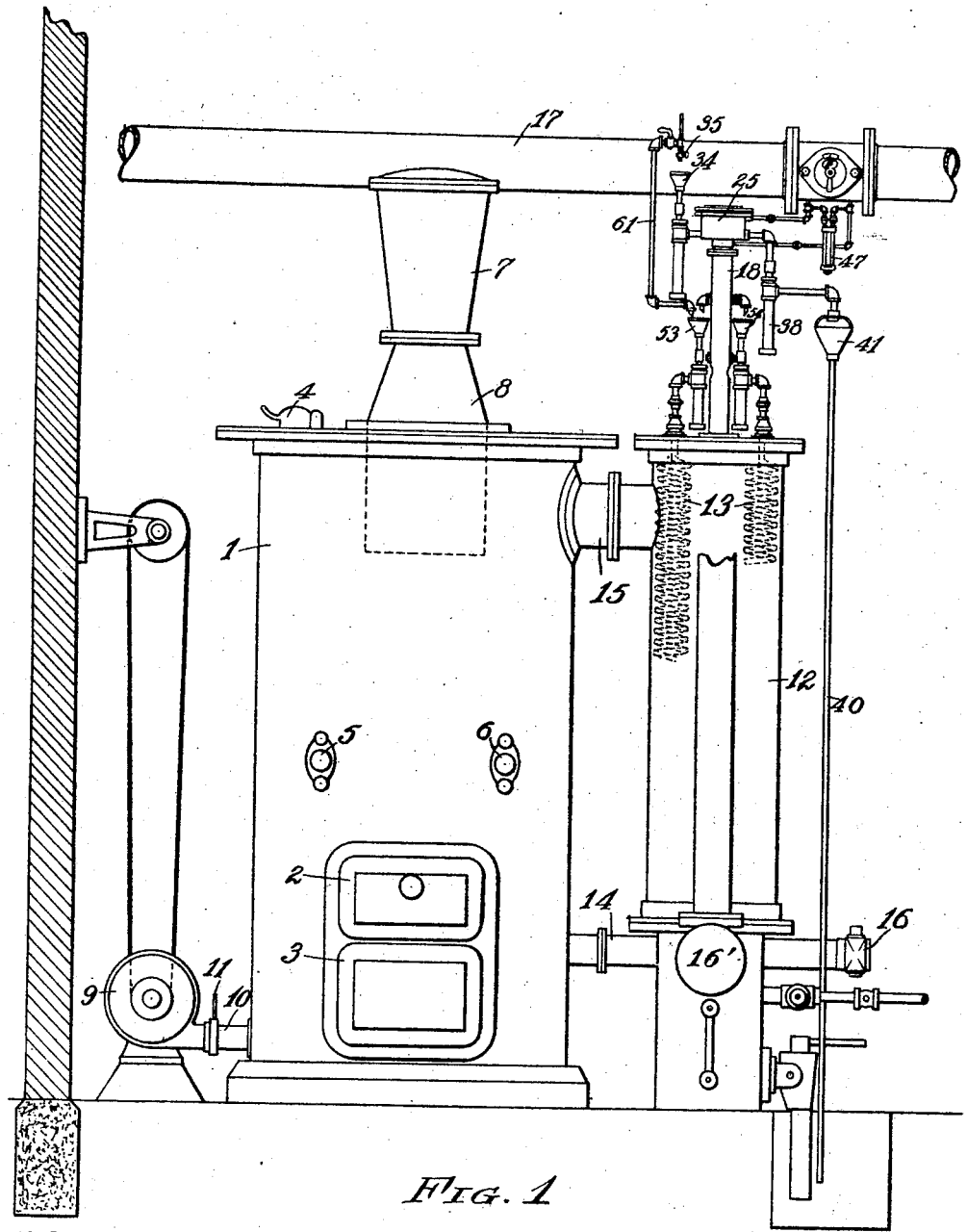
Figure 2:
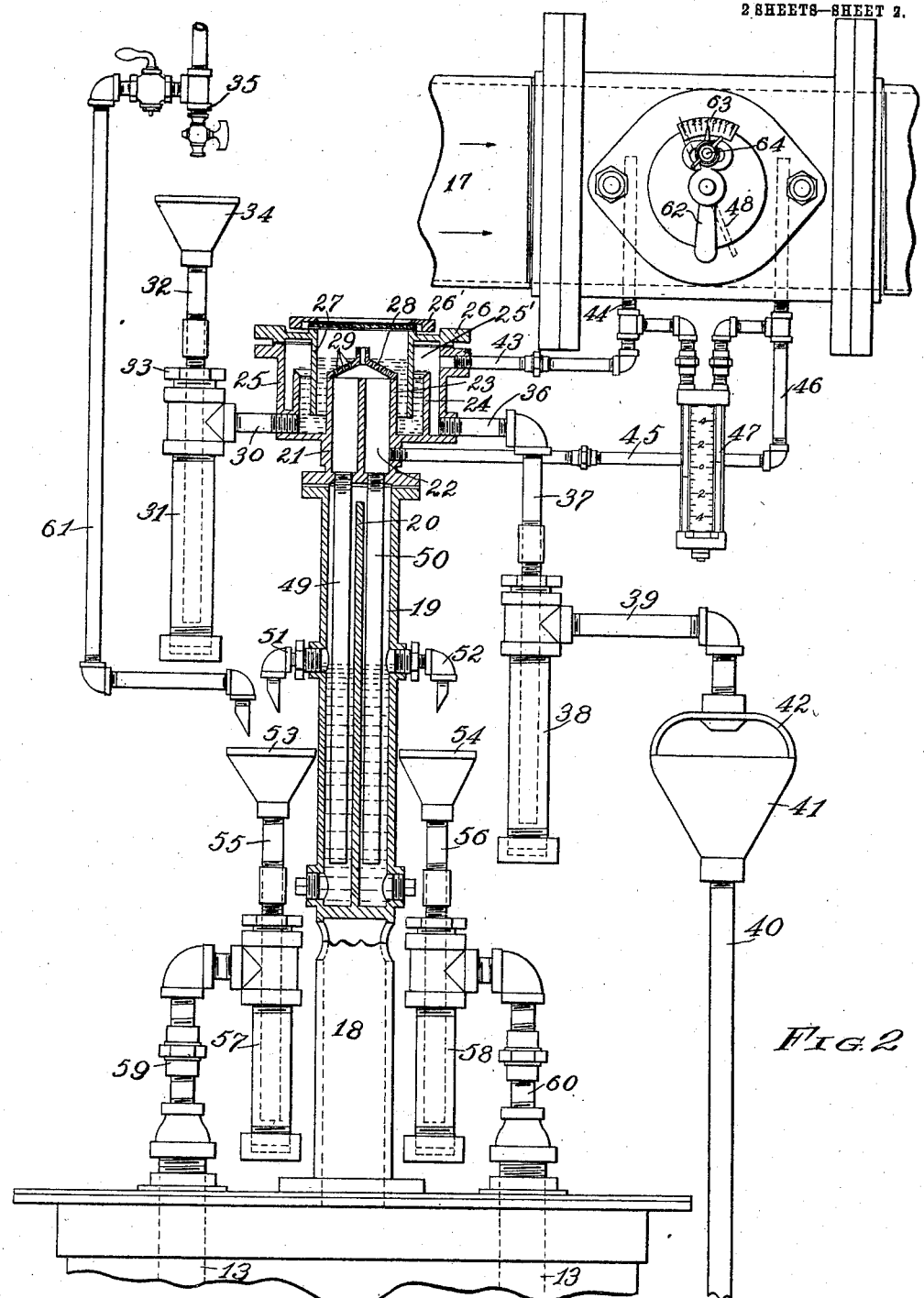

Figure 1 is a side elevation of a gas producer, vaporizer and water regulator; Fig. 2 is a side elevation, partly in section, of the water regulator and its associated parts.

The gas generator is represented at 1. This generator is of the ordinary suction producer type and needs no particular description. The clinker door is shown at 2 and the ash-pit door at 3, while poke holes are represented at 4, 5 and 6 respectively. Upon the top of the generator is mounted the hopper 7 and charging neck 8 by means of which the fuel is supplied to the interior of the generator. The air is supplied to the generator through a pipe 16.

The vaporizer is represented at 12 and comprises an outer casing surrounding coiled pipes 13 through which water is conducted and wherein due to the heat supplied from the gas passing through the vaporizer 12, changes the water to steam within the coils. However, the exact form of vaporizer here shown is not essential, and I do not confine myself to this particular form. At the lower portion of the vaporizer the coils are connected with a main 14 which leads to the interior of the producer 1. The air pipe 16 communicates with the main 14 with which the vaporizer coils also connect, so that a mixture of air and steam is supplied to the generator. The main 14 communicates with the generator below the fuel bed. A pipe 15 connects the generator with the vaporizer, so that all the gas formed in the generator passes through the said pipe 15, the vaporizer 12 and out through a pipe 16′, from whence it passes to the scrubber, thence to the purifier, and then is conducted under suction through the main 17 in the direction indicated by the arrows to the place where it is desired to use the gas.

Mounted upon the top portion of the vaporizer is the water regulator, and comprises a standard 18 having an inclosed chamber 19 at the upper portion thereof, which chamber is divided into two portions by means of the central partition 20 which extends nearly to the top thereof. The chamber is here shown divided, for it is intended for use with a vaporizer using two coils, if the vaporizer contained but one coil, chamber 19 would be undivided. The chamber 19 is divided into as many separate parts as there are coils in the vaporizer and each chamber is connected with a separate coil in the vaporizer.

Mounted upon the top of the chamber 18 is a member 21 having a central opening 22 which is surrounded by a wall 23. Outside of the wall 23 is a second wall 24 formed integrally with the base portion of the member 21 and extending upwardly. The wall 24 is surrounded by an outer wall 25 which forms a closure for the chambers contained therein. The wall 25 extends higher than either the wall 23 or the wall 24.

Mounted on the top of the wall 25 is a member 26 formed with a central opening having a surrounding flange 27. The member 26 is adapted to be inverted in its position upon the wall 25, so that the flange 27 extends into the chamber formed between the walls 23 and 24 and stops a short distance short of the bottom of said walls. The flange 27 entirely surrounds the wall 23. The opening in the member 26 is provided with a cover 26′ a portion of which is transparent thereby permitting observation of the interior of the casing 27.

The wall 23 has a cap 28 which is adapted to rest upon the upper portion thereof, the said cap being formed with a plurality of perforations 29. The wall 24 is constructed so as to be of the same height as the wall 23 plus the thickness of the cap 28. The space between the walls 23 and 24 is, by means of a pipe 30, connected with a chambered member 31, which member is supported in its position relative to the water regulator in any desired manner. A pipe 32 is adapted to extend into the chambered member 31 nearly to the bottom thereof and is secured in its position by means of a lock nut 33. The pipe 32 extends some distance above the member 31 and is provided at its upper end with a funnel 34 which is directly beneath a pipe 35 which is connected with a source of water supply.

Upon the opposite side of the regulator, to the pipe 30, the space formed between the wall 24 and the outside wall 25 is provided with an opening in which a pipe 36 is secured which communicates with a pipe 37. The pipe 37 communicates with a chambered member 38 and extends nearly to the bottom thereof. The chambered member is, by means of a pipe 39, connected with the waste pipe 40. A funnel-shaped member 41 having a bridge 42 to support the pipe 39 is inserted between the pipe 39 and pipe 40, so that the water discharged from the pipe 39 into the pipe 40 may be readily observed. A pipe 43 communicates with the space inside the wall 25 and above the top of the wall 24 and is connected with a pipe 44 which extends into the gas main. A second pipe 45 is connected with the chamber 22 and is likewise connected with a pipe 46 which extends into the gas main. The pipes 44 and 46 are connected with a gage 47, so that the difference in pressure in the two pipes may be readily observed.

In the gas main is situated a plate or diaphragm 48 which is so placed as to allow the gas to pass all around it, and the pipes 44 and 46 are upon opposite sides of this diaphragm. It will be evident that the suction in the gas main upon the opposite sides of the plate 48 will be different, due to the fact that the diaphragm will form a hindrance to the passage of the gas, thereby creating a greater pressure in the pipe 44 than in the pipe 46, or to state the proposition conversely, inasmuch as the gas in the main is under suction, the suction within pipe 46 will be greater than the suction within the pipe 44, consequently the tendency toward a vacuum in the chamber 22 will be greater than the tendency toward a vacuum in the chamber 25′ with which the pipe 43 communicates.

When water is supplied by means of the connection 35, it will rise within the chambered member 31 and, flowing through the pipe 30, will fill the space between the walls 23 and 24 and will eventually overflow the wall 24, and passing through the pipe 36 and pipe 37 will fall to the bottom of the chambered member 38, in which chamber it will rise outside the pipe 37, and, passing through the pipe 39, will flow out through the waste pipe 40. This will be the normal course of the water with all parts of the water regulator under atmospheric pressure. However, due to the arrangement hereinbefore described, the suction within the chamber 22 will be greater than the suction within the chamber 25′ with which the pipe 43 communicates. Consequently, the water will rise between the walls 23 and 27 to a height greater than the height of the wall 24, so that the holes 29 will be covered with water which will flow through the same. The water entering through the ports 29 will fall to the bottom of the chamber 22, which chamber is connected with pipes 49 and 50 and will pass to the lower end of the chambered portion of the member 18. The water will rise in this chambered portion around the exterior of the pipes 49 and 50 to the height of the outlet nozzles 51 and 52 which are situated above funnels 53 and 54. The said nozzles are attached to pipes 55 and 56, which pipes are secured to chambered members 57 and 58 and extend nearly to the bottom of the chambers within these members. The members 57 and 58 are, by means of suitable connections 59 and 60, connected with the water coils 13 within the vaporizer 12. The water passing through the outlet nozzles 51 and 52 will be received by the funnels 53 and 54 and, passing through the pipes 55 and 56, will be discharged into the chambers contained in the members 57 and 58, and, rising in the chambers of the members 57 and 58, will pass out through the connections 59 and 60 to the vaporizing coils. It will be observed that the water is allowed to fall through an open space between the outlet nozzles 51 and 52 and the receiving funnels 53 and 54. It will thus be possible to observe at all times the quantity of water which is passing to the vaporizing coils.

It will be seen that in the construction I have described above, the water discharging from the various pipes, is made below a water seal so that the gas is prevented from escaping from or air entering any part of the regulator.

By means of the independent connection 61 with the water supply pipe 35, any desired amount of water may be supplied to the vaporizing coils in excess of the amounts supplied through the water regulator, it being understood that a similar pipe 61 may be positioned adjacent to the funnel 54 in a manner similar to the illustration in Fig. 2 in connection with the funnel 53.

From the construction which I have described, it is evident that the suction within the pipes 44 and 46 will be proportionate to the amount of gas which is passing through the main and the amount of gas passing through the main will be proportionate to the requirements of gas consumption. As the demand becomes greater and the suction within the main increases, the suction upon the pipe 46 will increase and consequently the amount of water which will be drawn in through the apertures 29 will be increased, so that the amount of water supplied to the vaporizing coils will be increased and the amount of steam supplied to the generator itself will likewise be increased. It is therefore apparent that the water regulator will regulate the amount of steam supplied to the producer in a proportion exactly commensurate with the demand made upon the generator for gas by the consuming device which is being supplied. I have also provided a means whereby the amount of steam supplied to the producer may be regulated when a great volume of gas is passing through the main. The plate 48 which is normally inclined at an angle of about $22\frac{1}{2}$ degrees, is mounted upon pivots upon which it may be made to swing to assume positions between the vertical and an angle approximately 45 degrees. The movement of the plate 48 is accomplished by means of a handle 62 which is secured to the plate and by movement of the handle either to the left or right the plate will be made to assume a position in a plane oblique to its vertical position. An index needle is formed upon the end of the handle 62 which is adjacent a gage 63, so that the exact inclination of the plate may be accurately judged. A lock nut 64 is provided which securely locks the plate in its adjusted position.

It will be apparent that, in changing the position of the plate 48 from its vertical to an oblique position, the effective area upon which the gas will act is decreased, consequently the difference in suction within the pipes 44 and 46 will also be decreased and the water will not rise to so great a height within the chamber inclosed by the wall 27, so that the quantity of water supplied to the vaporizing coils will not be so great as when the plate 48 is in its vertical position. Consequently, the amount of steam supplied to the generator will be decreased, which will decrease the amount of hydrogen in the gas that is made by the generator, because the supply of steam which develops the hydrogen contained within the gas has been decreased.

It is evident from the foregoing description that I have provided a water regulator which is entirely automatic in its action and will itself regulate the amount of water supplied to the vaporizing coils independently of the control of the operator, and that the said supply of water to the vaporizing coils will be proportionate to the amount of gas required by the device supplied.

By regulating the position of the diaphragm, the chemical composition of the gas may be changed so that a gas having the desired amount of hydrogen may be obtained. Moreover, because of the ability to vary the quantity of water supplied to the generator, it is possible to maintain the fuel bed at as high a temperature as is practical, which is desirable to produce the most efficient results from fuels which vary largely in ash and the tendency to clinker.

It is evident from the foregoing description that I have provided a water regulator which is entirely automatic in its action, regulating the amount of water supplied to the vaporizer independently of the control of the operator. Moreover, with the diaphragm in a given position, the composition of the gas will be constant under all circumstances and regardless of the quantity of gas passing through the main, so that if the fuel bed becomes clogged and the air and steam with difficulty pass through the same, and the suction in the main increases due to such cause, even under such circumstances, the steam supplied will always be proportionate to the quantity of gas passing in the main and the composition of the gas will not be changed. Again, it will be seen that by my device it is possible to change the composition of the gas by changing the relative proportion of steam admitted to the generator and also by controlling the temperature of the fuel bed.

While my invention has been described in connection with a suction gas producer, I do not limit myself to this type, for it is evident that my invention would be equally applicable to a pressure gas producer and in fact is but a negative pressure, so that in the specification and claims, by the use of the term "pressure" I include positive as well as negative pressure.

Having thus described my invention, I claim:

1. In a gas producer, a generator, a main for conducting the gas formed within said generator, a vaporizer, said vaporizer being connected with the generator, a source of water supply for supplying the vaporizer with water, a regulator interposed between the water supply and the vaporizer, and means for connecting the said water regulator at two points in the gas main whereby the difference in suction at the two points in the gas main will regulate the supply of water to the vaporizer.

2. In a gas producer, a generator, a main for conducting the gas formed within said generator, a vaporizer, said vaporizer being connected with the generator, a source of water supply for supplying the vaporizer with water, a regulator interposed between the water supply and the vaporizer, means for connecting the said water regulator at two points in the gas main whereby the difference in suction at the two points in the gas main will regulate the supply of water to the vaporizer, and means for varying the difference in suction between the said points in the gas main.

3. In a gas producer, a generator, a gas main for conducting the gas formed within said generator, a vaporizer, said vaporizer being connected to the generator, a source of water supply, connection between the source of water supply and the vaporizer, a regulator interposed in the said connection, an obstruction in the gas main whereby a difference in suction in the said main will be produced upon opposite sides of the obstruction, and connections with the gas main upon the opposite sides of the obstruction whereby the suction upon the opposite sides of the obstruction will regulate the supply of water to the vaporizer.

4. In a water regulator, a member provided with two chambers, means for delivering a continuous supply of water to said chambers, the water in the said chambers being normally at the same level, an overflow from one of said chambers above the normal level of the water therein, and means for producing a relatively different pressure in each of said chambers, the lesser pressure being in the chamber provided with the overflow, whereby the water will be raised in said chamber to flow out through the overflow.

5. In a water regulator, a member provided with an outer wall and an inner wall and a wall intermediate the said walls, a member adapted to be seated upon the top of the outer wall and having a flange depending between the inner wall and the middle wall of the aforesaid member, and a water supply and outlet connected with the first mentioned member.

6. In a water regulator, a member having an outer wall, and a base provided with an opening, a wall surrounding said opening, and a cap seated upon the upper portion of the last mentioned wall, said cap being provided with perforations.

7. In a water regulator, a member provided with an outer wall, and a base provided with an opening and a wall surrounding said opening, a partition member secured to the said wall and dividing the space inclosed by the said wall into two portions, a cap member mounted upon the top portion of the last mentioned wall and provided with perforations.

8. In a water regulator, a member provided with an outer wall, and a base provided with an opening, a wall surrounding the said opening, a cap member mounted upon the upper end of the last mentioned wall and provided with perforations, a wall projecting upwardly from the base of the said member intermediate the interior and exterior wall, said interior wall and middle wall being of substantially the same height.

9. In a water regulator, a member provided with an outside wall, and a base provided with an opening, a wall surrounding the said opening, a wall projecting upwardly intermediate the outside and the inside wall and of substantially the same height as the inside wall, and a member adapted to rest upon the top of the outside wall having a downwardly projecting flange, said flange occupying a position between the interior and middle walls before mentioned and surrounding the interior wall.

10. In a water regulator, a member provided with an outside wall, and a base provided with an opening, a wall surrounding the said opening, a wall projecting upwardly intermediate the outside and the inside wall and of substantially the same height as the inside wall, and a member adapted to rest upon the top of the outside wall having a downwardly projecting flange, said flange occupying a position between the interior and middle walls before mentioned and surrounding the interior wall, the last mentioned member being provided with a transparent top plate.

11. In a water regulator, a member provided with an outside wall, and a base provided with an opening at the central portion, a wall surrounding said opening, a wall projecting upwardly from the base of the said member and intermediate the interior and exterior walls, a water inlet pipe communicating with the space between the interior and middle walls, and a water discharge pipe communicating with the space between the middle wall and the outside wall.

12. In a water regulator, a member provided with an outside wall, and a base provided with an opening, and a wall surrounding said opening, a pipe communicating with the space inside the wall surrounding the central opening, and a pipe communicating with the space inside the outside wall, said pipes being connected to the gas main and adapted to produce a relative different pressure in the said spaces with which they communicate.

13. In a water regulator, a member provided with an outside wall, and a base provided with an opening, a wall surrounding said opening, a wall projecting upwardly from the base of said member intermediate the exterior and interior wall and of substantially the same height as the interior wall, a member mounted upon the first mentioned member and having a flange depending therefrom between the interior and middle walls before mentioned and surrounding the interior wall, a water supply pipe connected with the space between the interior wall and the middle wall, and an outlet pipe connected with the space between the middle wall and the exterior wall, a pipe communicating with the space inside the interior wall, and a pipe communicating with the space inside the exterior wall, said pipes being connected with the gas main and adapted to produce a relatively different pressure in each of the spaces with which they communicate.

14. In a water regulator, a member provided with an outer wall, and a base provided with an opening, and a wall surrounding said opening, a cap adapted to rest upon the upper ends of said wall and provided with a plurality of perforations, a wall projecting upwardly from the base of said member intermediate the exterior and interior walls, a member adapted to rest upon the first mentioned member having a flange projecting downwardly between the interior and middle walls and surrounding the interior wall, a water connection communicating with the space between the interior wall and the middle wall, a water outlet communicating with the space between the outside wall and the middle wall, a pipe communicating with the space within the exterior wall, a pipe communicating with the space within the interior wall, and means for producing a relatively greater pressure in the second mentioned pipe than in the first mentioned pipe, whereby the water will flow through the perforations in the above mentioned cap.

15. In a water regulator, a member provided with two chambers, a water inlet to said chambers, an overflow communicating with one of said chambers, a pipe communicating with said overflow, a chambered member surrounding the pipe, said pipe extending to a point near the lower portion of said chambered member, and an outlet from the chambered member at a point above the bottom of the pipe.

16. In a water regulator, a member provided with two chambers, a water inlet to said chambers, an overflow connected with one of said chambers, a plurality of pipes connected with said overflow, a member provided with a plurality of chambers surrounding the said pipes, each pipe extending into a separate chamber and to a point near the bottom of said chamber, an outlet provided from each of said chambers at a point above the bottom of the said pipes.

17. The combination with a vaporizer, a source of water supply and a connection between said vaporizer and the water supply, of a water regulator interposed in said connection, said water regulator comprising a member provided with two chambers adapted to be connected with the water supply, an overflow communicating with one of said chambers, a pipe connected with said overflow, a chambered member surrounding the pipe, said pipe extending to a point near the bottom of said chamber, an outlet from the chamber at a point above the lower end of the pipe, and a pipe connected to the vaporizer and provided with a funnel, said funnel being positioned beneath the outlet from the said chamber, whereby the water may be observed as it passes from the outlet.

18. The combination with a vaporizer, a source of water supply, a connection between the source of water supply and the vaporizer, a water regulator interposed in said connection, a discharge outlet connected with the water regulator for the excess water supplied to said regulator, means for observing the water passing through said discharge, and means for observing the amount of water which has passed through the regulator to the vaporizer.

19. In a suction gas producer, a generator, a main for conducting the gas formed within said generator, a vaporizer, a source of water supply, connections between said source of water supply and the vaporizer, a regulator interposed in said connection, said regulator comprising a casing provided with two chambers, means for admitting water to the said chambers, the water being adapted to stand normally at the same level in said chambers, an overflow from one of said chambers above the level of the water therein, means for connecting each of said chambers at a given point with the gas main, means in the gas main for producing a different pressure upon each of the chambers, the chamber having the overflow being normally under the least pressure, whereby the water will be caused to rise in said chamber and flow out through the overflow, and a connection between said overflow and the aforesaid vaporizer.

20. In a suction gas producer, a generator, a gas main for conducting the gas formed within said generator, a vaporizer, a source of water supply, a connection between said source of water supply and the vaporizer, a water regulator interposed in said connection, said regulator comprising a casing provided with two chambers, means for admitting water to the said chambers, an overflow from one of said chambers connected with the vaporizer, said overflow being above the normal level of the water in said chamber, means for connecting each of said chambers at a given place with the gas main, an obstruction in said gas main between the points of connection therewith of the said chambers, whereby a difference in pressure will be produced in the respective chambers, the least pressure being in the chamber having the overflow, whereby the water will be caused to rise in said chamber and flow out through the overflow to the vaporizer.

21. In a gas producer, a generator, a main for conducting the gas formed within said generator, a vaporizer, a source of water supply, a water regulator, said regulator comprising a casing provided with two chambers, means for admitting water to said chambers from the source of water supply, one of said chambers being provided with an overflow, means for connecting said overflow with the vaporizer, said overflow being positioned above the normal level of the water in said chamber, means for connecting each of said chambers at a given point with the gas main, a plate in said gas main between the points of communication therewith of the said chambers, said plate being pivotally mounted, whereby its position may be varied to produce different relative suctions within the chambers connected with the gas main, the least pressure always being communicated to the chamber having the overflow.

22. In a gas producer, a generator, a main for conducting the gas formed within said generator, a vaporizer, a water regulator for regulating the supply of water to said vaporizer, said regulator comprising a casing having two chambers, pipes connecting each of said chambers with the gas main at different points, an obstruction in said gas main between the two pipes, whereby a difference in pressure will be created within the said pipes.

23. In a gas producer, a generator, a main for conducting the gas formed within said generator, a vaporizer, a water regulator for regulating the supply of water to said vaporizer, said regulator comprising a casing having two chambers, pipes connecting each of said chambers with the gas main at different points, a plate in said gas main, said plate being pivotally mounted therein and adapted to present different effective areas of plate to the gas passing through the said main, whereby the relative pressure in the two pipes may be varied.

24. In a gas producer, a generator, a main for conducting the gas formed within said generator, a vaporizer, a water regulator for regulating the supply of water to said vaporizer, said regulator comprising a casing having two chambers, pipes connecting each of said chambers with the gas main at different points, a plate in said gas main between the said pipes, said plate being pivotally mounted to said main, a handle operatively secured to said plate, whereby the same may be moved to present different effective areas of the plate to the gas passing through the said main, and means for locking the said plate in its adjusted position.

25. In a gas producer, a generator, a main for conducting the gas formed within said generator, a vaporizer, a water regulator for regulating the amount of water supplied to said vaporizer, said regulator comprising a casing provided with two chambers, pipes connecting each of said chambers with the gas main at different points, an obstruction in said gas main between the two pipes, whereby a difference in pressure will be produced in the said pipes, and a gage operatively connected to the said pipes for registering the difference in suction therein.

26. In a gas producer, a generator, a main for conducting the gas formed within said generator, a vaporizer, a water regulator for regulating the amount of water supplied to said vaporizer, the water regulator being connected to the gas main at two different points, an obstruction in said main between the points at which the water regulator connects whereby a difference in pressure will be created at the two points of connection of the water regulator, said different pressure being communicated to the water regulator, whereby the amount of water supplied to the vaporizer will be regulated.

27. In a gas producer, a generator, a main for conducting the gas formed within said generator, a vaporizer, a water regulator for regulating the amount of water supplied to the vaporizer, two pipes connected to the water regulator and communicating with the gas main at two different points, means interposed in said main between the points at which the pipes communicate with the main to obstruct the passage of gas through the main, whereby a difference in pressures is created in the said pipes, said means being adjustable to obstruct the passage of gas in the main to a greater or less degree, whereby the pressures in the pipes will be varied and relatively increased or decreased, said pressures being communicated to the water regulator to control the amount of water supplied to the vaporizer.

28. In a gas producer, a generator, a main for conducting the gas formed within said generator, a vaporizer, a water regulator for controlling the supply of water to said vaporizer, said water regulator being connected with the gas main at two different points, an obstruction in said gas main between the two pipes, and means for varying the position of said obstruction so as to vary the effective cross sectional area of the gas main.

In testimony whereof, I hereunto affix my signature in the presence of two witnesses.

ERICH SANDNER.

Witnesses:
H. MILLER,
BRENNAN B. WEST.